No. 635,137. Patented Oct. 17, 1899.
F. KENNEDY.
MACHINE FOR MOLDING POPCORN.
(Application filed Dec. 8, 1898.)

(No Model.) 3 Sheets—Sheet 1.

No. 635,137. Patented Oct. 17, 1899.
F. KENNEDY.
MACHINE FOR MOLDING POPCORN.
(Application filed Dec. 8, 1898.)
(No Model.) 3 Sheets—Sheet 2.

WITNESSES:
A. D. Harrison
P. W. Pizzetti

INVENTOR:
Frank Kennedy
by Wright, Brown & Quinby
attys.

No. 635,137. Patented Oct. 17, 1899.
F. KENNEDY.
MACHINE FOR MOLDING POPCORN.
(Application filed Dec. 8, 1898.)
(No Model.) 3 Sheets—Sheet 3.

WITNESSES
A. D. Harrison
P. W. Pezzetti

INVENTOR:
Frank Kennedy
Wright, Brown & Quinby
Attys.

UNITED STATES PATENT OFFICE.

FRANK KENNEDY, OF CAMBRIDGE, MASSACHUSETTS.

MACHINE FOR MOLDING POPCORN.

SPECIFICATION forming part of Letters Patent No. 635,137, dated October 17, 1899.

Application filed December 8, 1898. Serial No. 698,604. (No model.)

*To all whom it may concern:*

Be it known that I, FRANK KENNEDY, of Cambridge, in the county of Middlesex and State of Massachusetts, have invented certain new and useful Improvements in Machines for Molding Popcorn, of which the following is a specification.

This invention has relation to popcorn-machines—that is to say, machines for compressing popcorn and other similar substances into blocks or cakes of various shapes—and has for its object to provide such improvements in machines of the class named as will increase their efficiency and render them practically automatic in operation.

The present invention comprehends a machine having a plurality of traveling molds and a rotatory carrier which is movable toward and from the traveling molds, so that as the molds are fed intermittingly into alinement with the dies the latter operate to compress the material therein.

The invention further consists of a machine of the character described in which the molds are removable and interchangeable, whereby the machine is adapted to turn out cakes of round, spherical, oblong, or other shapes to suit the fancy of the public, the dies being also interchangeable to fit the molds.

The invention also consists in a popcorn-machine having certain features of construction and relative arrangement of parts, as illustrated upon the accompanying drawings, described in the following specification, and particularly pointed out in the claims hereto appended.

Reference is to be had to the accompanying drawings, and to the letters and figures marked thereon, forming a part of this specification, the same characters designating the same parts or features, as the case may be, wherever they occur.

Figure 1:
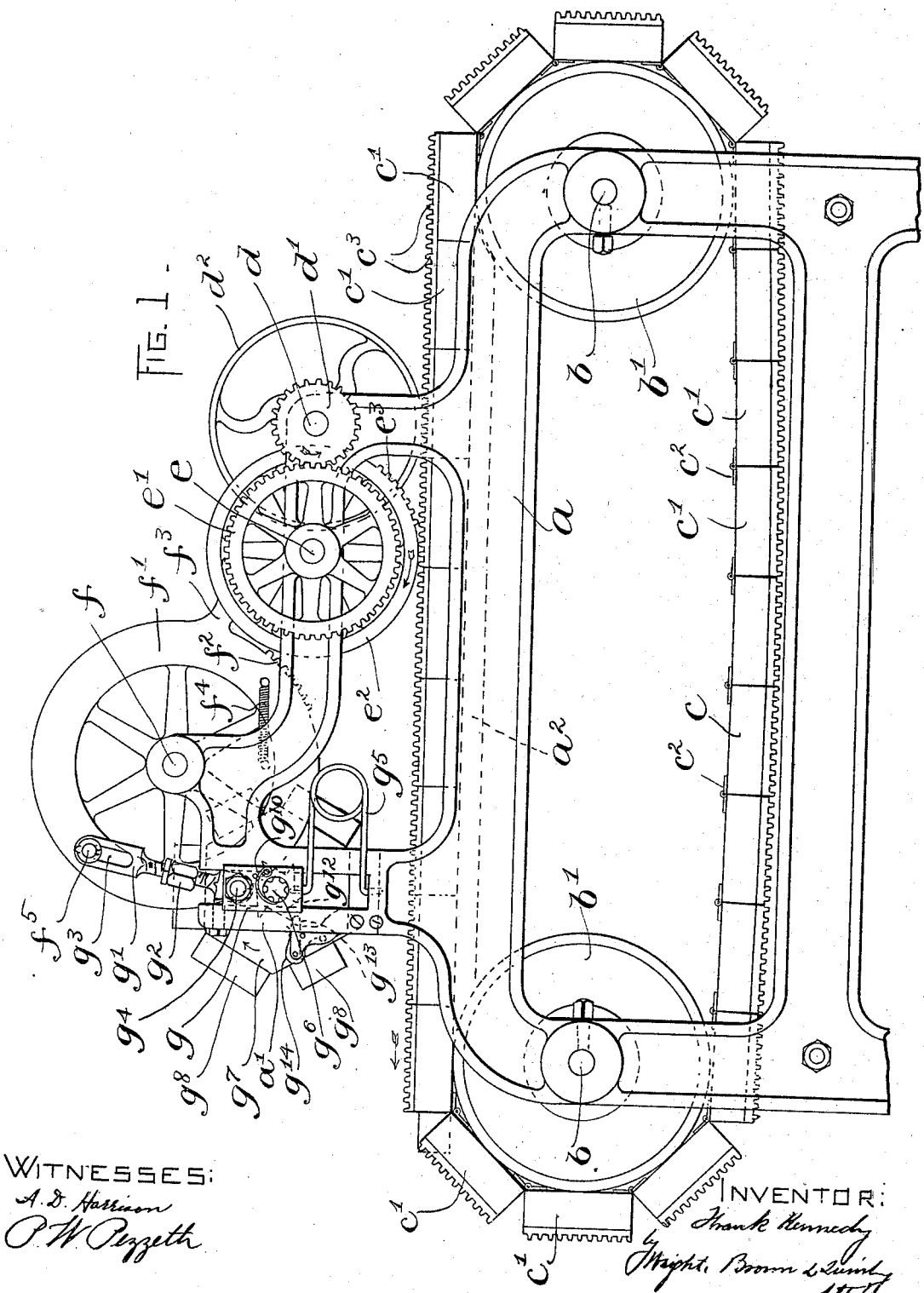
Figure 2:
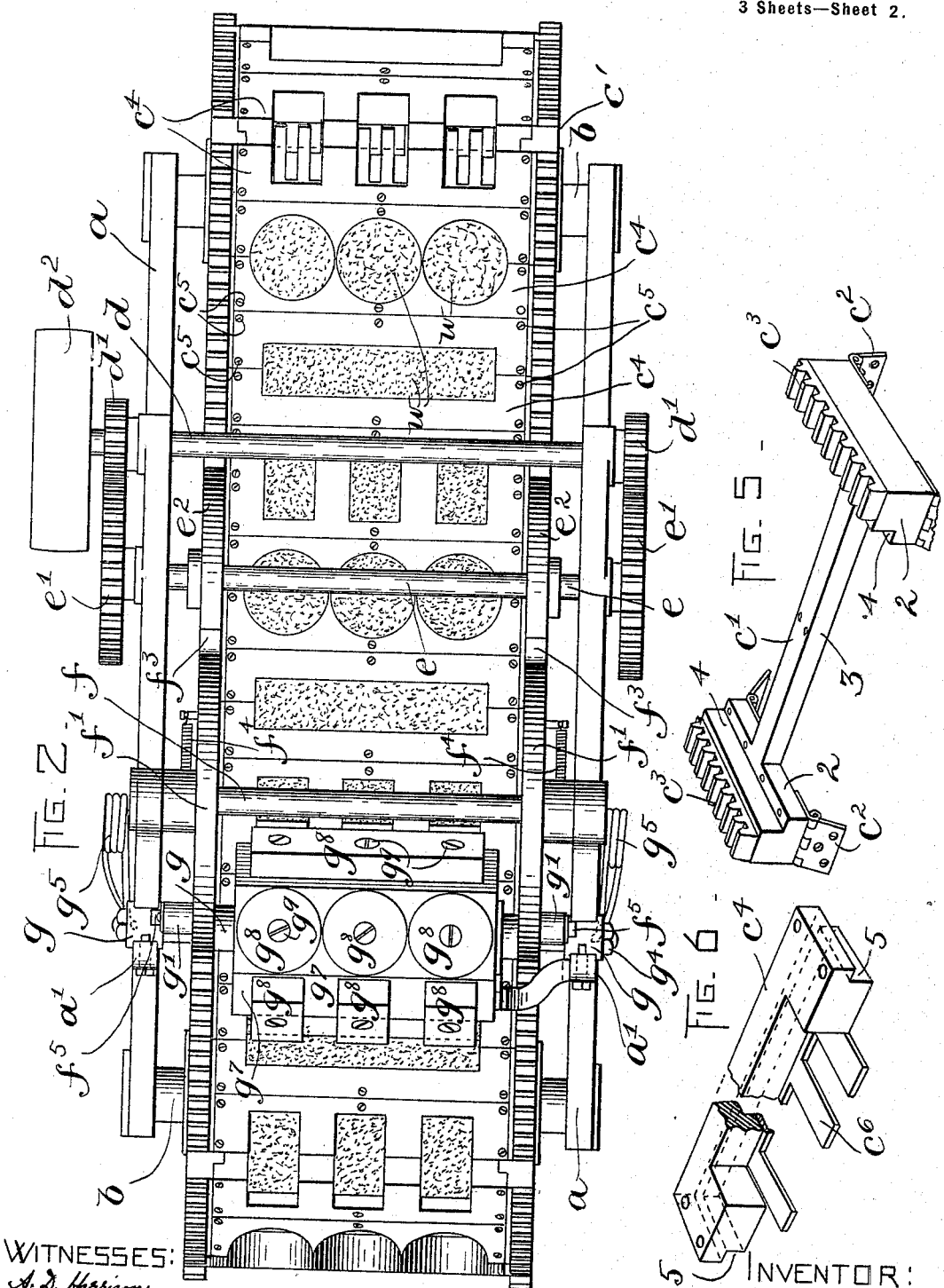
Figure 3:
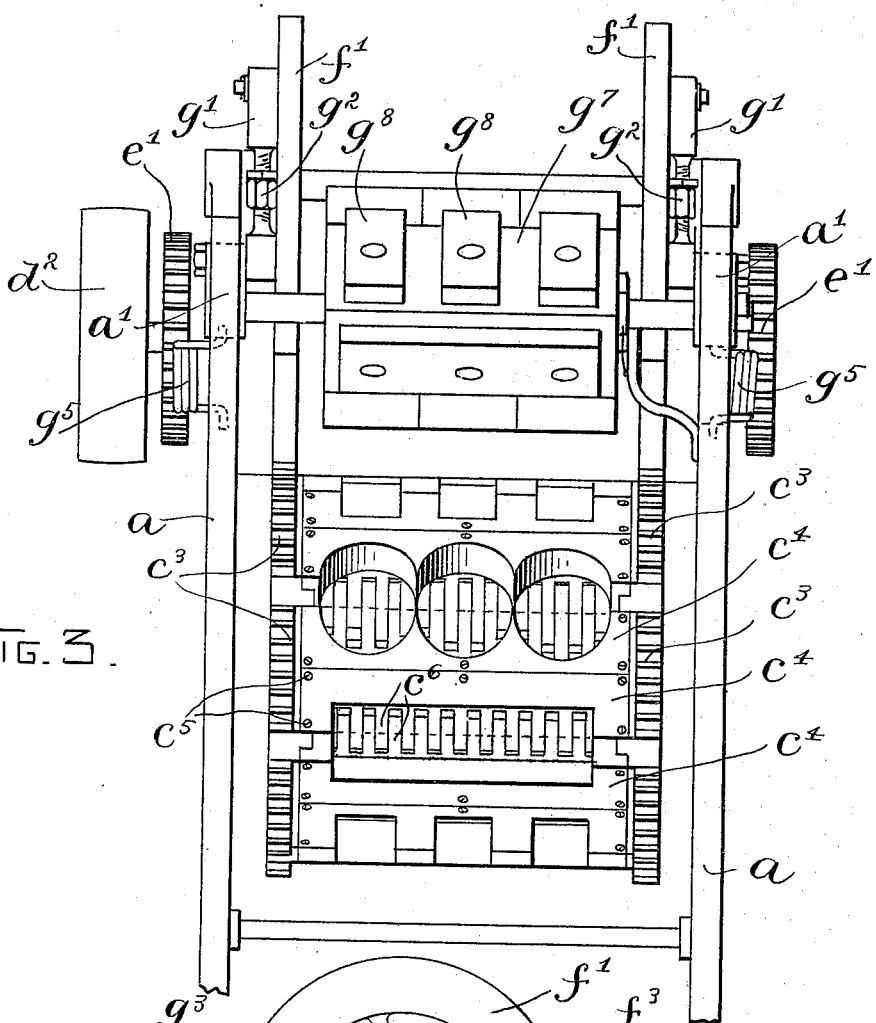
Figure 4:
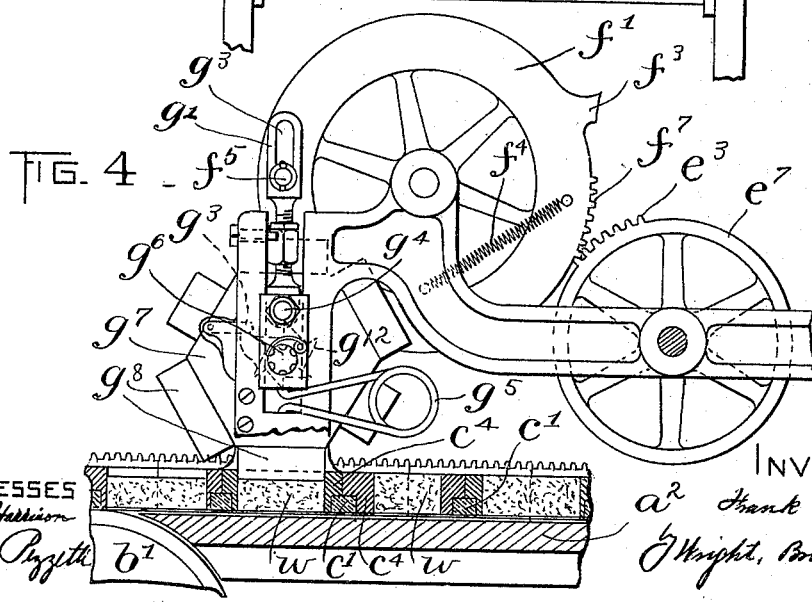

Figure 1 represents in side elevation a machine embodying my invention. Fig. 2 represents a plan view of the same. Fig. 3 represents an end elevation of the machine. Fig. 4 represents a side elevation, partially in section, of a portion of the molds and the die-carrier, the latter being in its operative position. Fig. 5 illustrates one section of the mold-carrier. Fig. 6 represents one section of a mold.

Referring to the drawings, $a$ designates a framework having bearings at its ends for journaling two shafts $b\ b$, which carry rollers $b'\ b'$. The said rollers guide and support the mold member of the machine, which consists of an endless series or chain of molds. The mold member, as here shown, is made up of a series of rigid sections or mold-carriers $c'\ c'$, attached to each other by means of hinges $c^2\ c^2$, and each having along its sides two rack-segments $c^3\ c^3$. The endless mold chain is divided by the rollers $b'\ b'$ into two substantially parallel stretches, the upper one of which slides over and is guided by means of a shelf or table $a^2$, forming part of the frame. When the mold-carriers are in this upper stretch, their rack-segments $c^3\ c^3$ together form two practically-continuous parallel racks, which are engaged by the driving-gears, so as to propel the mold member in a manner presently to be described. Each of the mold-carriers, as shown in detail in Fig. 5, consists of two parallel end pieces or bars 2 2 and a cross-bar 3 joining said end pieces. At the extremities of the end pieces 2 2 are attached the hinges $c^2\ c^2$, and on the top edges of said end pieces are formed or secured the racks $c^3\ c^3$. The divisional line between adjacent rigid sections or carriers $c'$ marks the division between two parts of a separable mold, the mold proper being composed of two suitably-shaped blocks $c^4\ c^4$, attached to adjacent carriers $c'\ c'$. The end pieces 2 2 of said carriers, as shown in Fig. 5, are formed with grooves or recesses 4 4, and each of the mold-blocks $c^4$ is formed on its side and ends with a groove or recess 5, the top of which recess is a flange adapted to fit within the recesses 4 4 and over the cross-bar 3. The mold-blocks $c^4$ and the mold-carriers are formed with screw-holes for the reception of screws $c^5\ c^5$, by means of which the said mold parts are attached to the said carriers. One of the mold-carriers $c'$ supports back to back two halves or blocks $c^4$ belonging to different molds, and the adjacent carrier $c'$ on either side carries the other half of the two respective molds, said construction forming a continuous series of molds, as will be readily understood by reference to the drawings.

The popcorn or other substance may be placed in the molds by hand or may be fed thereto from a hopper or other suitable magazine, and the molds may also, as shown in the drawings, be of different shape, so as to turn out the popcorn in oblong bars, short rectangular cakes, circular disks, or other forms. As the chain of molds is fed along by the driving machinery it passes beneath a reciprocatory die-carrier, which will be presently described and which compresses the popcorn in the molds, and after such compression it passes over the roll $b'$ at the left hand of the machine and the molded cakes are there ejected into a suitable receptacle. The means for ejecting the cakes comprise thin plates $c^6$, attached to the bottoms of the mold-blocks $c^4$, and each formed with parallel fingers or projections separated by spaces. The projections on one half of the mold extend into the spaces between the projections on the other half and beyond the line of the hinge which connects the two parts of the mold, so that when the mold opens in passing over the roller $b'$ these fingers will exert an outward pushing or expelling action on the formed cakes, which will eject the said cakes from the molds.

Above the chain of molds in suitable guides $a'$ $a'$ at the sides of the machine are mounted sliding bearing-blocks $g$ $g$, which journal a shaft $g^6$. On said shaft is mounted the die-carrier $g^7$, carrying on its periphery a number of dies $g^8$ $g^8$, corresponding in shape to the several different patterns of molds. The bearing-blocks $g$ $g$ are normally held in a raised position by means of springs $g^5$ $g^5$ and are pivotally connected at their upper ends by means of studs $g^4$ with pitman-rods $g'$ $g'$, the latter being in turn connected by pins or studs $f^5$ with wheels $f'$, mounted at opposite ends of a shaft $f$. The latter is journaled in suitable bearings in the frame $a$. Also journaled in bearings in said frame is a shaft $d$, carrying at its opposite ends two gear-pinions $d'$ $d'$ and at one end a belt-wheel $d^2$, adapted to be belted to a suitable source of power. The pinions $d'$ $d'$ mesh with gear-wheels $e'$ $e'$, carried at opposite ends of a shaft $e$, which also carries two mutilated gears $e^2$ $e^2$. The latter are provided with teeth $e^3$ $e^3$ for only a small distance on their peripheries, and these teeth are adapted to mesh with the rack-teeth $c^3$ on the mold member $c$ and also with teeth $f^2$, formed on the wheel $f'$. Thus as the mutilated gears $e^2$ are continuously rotated they will first engage the rack-teeth $c^3$ and move the mold member ahead a distance corresponding to the distance between two adjacent molds and thereafter will engage the teeth on the wheels $f'$ and will rotate said wheels until the gear-teeth $e^3$ and $f^2$ become disengaged, as they are about to become in the position of parts represented in Fig. 4.

Springs $f^4$ then return the wheels $f'$ to their original position, and projections or stops $f^3$ thereon abut against the smooth rims of the wheels $e^2$, so as to limit the return motion of the said wheels $f'$. The upper ends of the pitmen $g'$ are slotted, as at $g^3$, so that the initial motion of the wheels $f'$ does not depress the bearing-blocks $g$; but as the said wheels continue to move, the blocks through the agency of the pitmen are depressed and carry with them the die-carrier $g^7$. The shaft $g^6$ of said die-carrier is provided with a toothed wheel or ratchet $g^{12}$, and in line with the teeth of said ratchet is mounted a stationary pivoted pawl $g^{13}$, which holds rigidly when force is exerted against it in a downward direction, but yields against a spring $g^{14}$ when force is exerted upwardly. The ratchet $g^{12}$ engages said pawl in the downward movement of the die-carrier, and said carrier is rotated thereby a distance of one tooth, which corresponds to the distance between two adjacent dies on the carrier. Such rotation of the die-carrier takes place during the first portion of its downward movement and thereafter the die which is about to come into action moves in a straight path into the mouth of the mold which lies below it, compressing the material therein, as shown in Fig. 4. A spring check-pawl $g^{10}$, engaging teeth cut in the end of the shaft $g$, holds said shaft against backward rotation, and on the upward movement of the die-carrier the ratchet $g^{12}$ displaces and passes the pawl $g^{13}$. As shown in the drawings, the pitmen $g'$ are provided with turnbuckles $g^2$ for purposes of adjustment.

It will be seen from the foregoing description that I have provided a very simple machine for molding popcorn or other materials into different shapes and have also provided an improved construction employing molds of a convenient form and also providing for the removal and interchangeability of said molds.

I do not confine myself to the exact details of construction herein set forth, as the same may be considerably varied without departing from the spirit of my invention.

I claim—

1. In a machine of the character specified, mold-carriers forming an endless chain and flexibly connected together, each carrier having two mold-blocks independently and detachably secured to it, said two mold-blocks forming parts of two adjacent divided molds.

2. In a machine of the character specified, a mold made in two parts hinged together, and an ejector attached to one part and projecting beyond the line of the hinge toward the other part, whereby when the mold is opened, the molded article will be automatically ejected.

3. In a machine of the character specified, a mold member comprising a series of molds connected together, each mold made in two parts hinged together, an ejector on each part projecting beyond the line of the hinge toward the other part, a roll for guiding the mold member, and means for propelling said mold member, the molds opening out as they pass around said roll, and automatically ejecting the molded article.

4. In a machine of the character specified, a series of traveling molds of different patterns, a rotary die-carrier having dies to correspond to the several patterns of molds, means for rotating the carrier, and means for reciprocating said carrier toward and from the molds.

5. In a machine of the character specified, a series of traveling molds, a rotary die-carrier, a ratchet on the shaft of said die-carrier, a stationary pawl in the path of said ratchet, and means for reciprocating the die-carrier toward and from the molds, the said pawl coöperating with the said ratchet during such reciprocation of the die-carrier, to rotate said carrier.

6. In a machine of the character specified, a series of traveling molds, a rotary die-carrier having its shaft carried in sliding bearings, pitmen connected with said bearings, rocking members connected with said pitmen and provided with gear-teeth, and mutilated gears adapted to engage said gear-teeth and impart an intermittent motion to the said rocking members, whereby the die-carrier is reciprocated.

7. In a machine of the character specified, a series of traveling molds having gear-teeth, a rotary and reciprocatory die-carrier, a rocking member adapted to reciprocate said die-carrier and provided with gear-teeth, and a mutilated gear adapted to engage the gear-teeth on the molds and on said rocking member, whereby the said molds and rocking member are intermittently operated.

In testimony whereof I have affixed my signature in presence of two witnesses.

FRANK KENNEDY.

Witnesses:
  MARCUS B. MAY,
  R. M. PIERSON.